(12) United States Patent
Nayak et al.

(10) Patent No.: US 11,155,303 B2
(45) Date of Patent: Oct. 26, 2021

(54) LOAD DEFLECTION SYSTEM FOR SMALL OVERLAP IMPACT

(71) Applicant: GM GLOBAL TECHNOLOGY OPERATIONS LLC, Detroit, MI (US)

(72) Inventors: Ashish Nayak, Bhopal (IN); Dheeraj Jha, Bengaluru (IN); Manoj Marella, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 16/718,408

(22) Filed: Dec. 18, 2019

(65) Prior Publication Data

US 2021/0188358 A1 Jun. 24, 2021

(51) Int. Cl.
*B62D 21/15* (2006.01)
*B62D 21/02* (2006.01)
*B62D 25/20* (2006.01)

(52) U.S. Cl.
CPC .......... *B62D 21/155* (2013.01); *B62D 21/02* (2013.01); *B62D 25/20* (2013.01)

(58) Field of Classification Search
CPC ....... B62D 21/155; B62D 25/20; B62D 21/02
USPC .................................................. 296/187.05
See application file for complete search history.

(56) References Cited

U.S. PATENT DOCUMENTS

| | | | | |
|---|---|---|---|---|
| 5,033,593 A * | 7/1991 | Kazuhito | ............... | B60J 5/0444 188/377 |
| 6,485,072 B1 * | 11/2002 | Werner | ................... | B60R 19/12 293/120 |
| 8,991,901 B2 * | 3/2015 | Stockard | ................ | B60R 19/34 296/187.03 |
| 9,016,768 B2 * | 4/2015 | Makino | ................ | B62D 21/152 296/187.1 |
| 9,527,464 B2 * | 12/2016 | Clauser | ................... | B60R 19/24 |

* cited by examiner

*Primary Examiner* — Joseph D. Pape
*Assistant Examiner* — Dana D Ivey
(74) *Attorney, Agent, or Firm* — Quinn IP Law

(57) ABSTRACT

A structural arrangement for a vehicle includes a vehicle frame including an upper front rail, a frame rail, and a front hinge pillar, the frame rail extending parallel to a vehicle body axis and the front hinge pillar extending perpendicular to the vehicle body axis, the frame rail including a pulley, a load deflection system including a load member coupled to the upper front rail at a first attachment point, coupled to the frame rail at a detachable attachment point, and coupled to the front hinge pillar at a non-detachable attachment point such that the cable member extends generally longitudinally along the frame rail. The load member passes around the pulley from the first attachment point to the detachable attachment point and defines a load path between the upper front rail and the front hinge pillar utilizing the strength the frame rail.

20 Claims, 4 Drawing Sheets

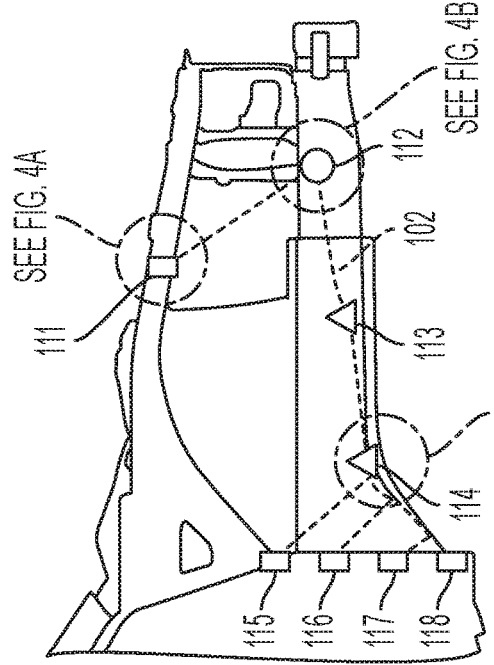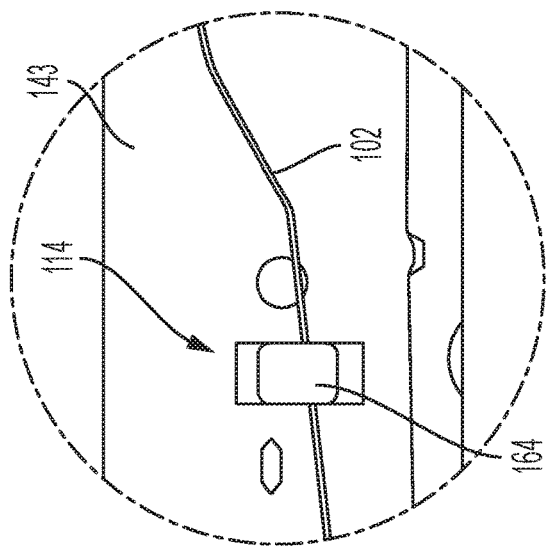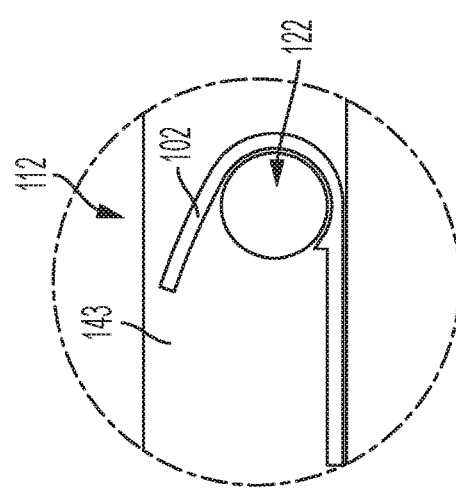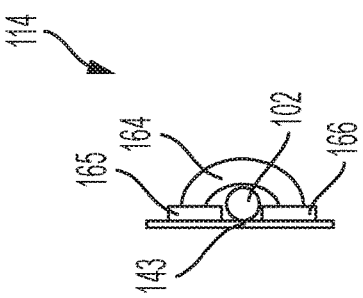

LOAD DEFLECTION SYSTEM FOR SMALL OVERLAP IMPACT

INTRODUCTION

The present disclosure relates generally to a load deflection system, including a cable-based system, for deflecting loads imparted by small overlap impact events to a vehicle.

Vehicle manufacturers use a variety of structures and components to transfer energy throughout the vehicle structure to protect the vehicle components and a vehicle's occupants during a collision. Frequently, additional structural members are used to buttress the vehicle body structure, as well as for supporting various chassis and powertrain subsystems. However, additional structural members add weight and complexity to the vehicle structure.

SUMMARY

Embodiments according to the present disclosure provide a number of advantages. For example, embodiments according to the present disclosure enable efficient means of transfer of loads using a cable-based load deflection system that incorporates the front rail strength to reduce vehicle intrusions and increase vehicle performance robustness in small overlap frontal impact events.

In an exemplary embodiment of the present disclosure, a structural arrangement for a vehicle includes a vehicle frame including an upper front rail, a frame rail, and a front hinge pillar, the frame rail extending parallel to a vehicle body axis and the front hinge pillar extending perpendicular to the vehicle body axis; and a load deflection system. The load deflection system includes a load member, a first attachment point, a pulley coupled to the frame rail at a second attachment point, a third attachment point, and a fourth attachment point, and the load member is coupled to the upper front rail at the first attachment point, coupled to the frame rail at the third attachment point, and coupled to the front hinge pillar at the fourth attachment point, the load member extending generally longitudinally along the frame rail. The load member passes around the pulley from the first attachment point to the fourth attachment point to define a load path between the upper front rail, the frame rail, and the front hinge pillar.

In some aspects, the load member is a stainless-steel cable having a first end and a second end opposite the first end, the first end coupled to the upper front rail at the first attachment point and the second end coupled to the front hinge pillar at the fourth attachment point.

In some aspects, the first attachment point is non-detachable from the upper front rail and the third attachment point includes a connection member that receives the load member and is detachable from the frame rail upon application of a load to the vehicle.

In some aspects, the third attachment point includes a first detachable attachment point and a second detachable attachment point, the first detachable attachment point including a first connection member that receives the load member and the second detachable attachment point including a second connection member that receives the load member, each of the first and second connection members detachable from the frame rail upon application of a load to the load member.

In some aspects, the fourth attachment point is non-detachable from the front hinge pillar.

In some aspects, the fourth attachment point includes a first non-detachable attachment point, a second non-detachable attachment point, a third non-detachable attachment point, and a fourth non-detachable attachment point, the first, second, third, and fourth non-detachable attachment points arranged or aligned vertically along the front hinge pillar and each of the first, second, and third non-detachable attachment points are indirectly coupled to the load member and the fourth non-detachable attachment point is directly coupled to the load member.

In some aspects, the load deflection system further includes a first auxiliary cable member coupled to the load member and to the first non-detachable attachment point, a second auxiliary cable member coupled to the load member and to the second non-detachable attachment point, and a third auxiliary cable member coupled to the load member and to the third non-detachable attachment point.

In some aspects, the load member is a stainless-steel cable and the first, second, and third auxiliary cable members are stainless-steel cable members that are spliced to the load member.

In some aspects, the pulley of the second attachment point is forward of the first, third, and fourth attachment points and the third attachment point is forward of the fourth attachment point.

In some aspects, in response to application of a small offset impact to the vehicle, the load member detaches from the third attachment point, engages the upper front rail, the frame rail, and the front hinge pillar and moves in both upward and outward directions relative to the vehicle body axis such that the load member moves away from the frame rail.

In another exemplary embodiment of the present disclosure, an automotive vehicle includes a vehicle body structure having a vehicle body axis and a vehicle frame arranged along the vehicle body axis, the vehicle body structure defining a passenger compartment and the vehicle frame including an upper front rail, a frame rail, and a front hinge pillar, the frame rail extending parallel to the vehicle body axis and the front hinge pillar extending perpendicular to the vehicle body axis, the vehicle frame supporting a wheel and a load deflection system. The load deflection system includes a load member, a first attachment point, a pulley coupled to the frame rail at a second attachment point, a third attachment point, and a fourth attachment point, and the load member is coupled to the upper front rail at the first attachment point, coupled to the frame rail at the third attachment point, and coupled to the front hinge pillar at the fourth attachment point, the load member extending generally longitudinally along the frame rail. The load member passes around the pulley from the first attachment point to the fourth attachment point to define a load path between the upper front rail, the frame rail, and the front hinge pillar to utilize the strength of the frame rail and the load member is forward of the passenger compartment.

In some aspects, the load member is a stainless-steel cable having a first end and a second end opposite the first end, the first end coupled to the upper front rail at the first attachment point and the second end coupled to the front hinge pillar at the fourth attachment point.

In some aspects, the first attachment point is non-detachable from the upper front rail, the fourth attachment point is non-detachable from the front hinge pillar, and the third attachment point includes a first detachable attachment point and a second detachable attachment point, the first detachable attachment point including a first connection member that receives the load member and the second detachable attachment point including a second connection member that receives the load member, each of the first and second connection members detachable from the frame rail upon application of a load to the load member.

In some aspects, the fourth attachment point includes a first non-detachable attachment point, a second non-detachable attachment point, a third non-detachable attachment point, and a fourth non-detachable attachment point, the first, second, third, and fourth non-detachable attachment points arranged or aligned vertically along the front hinge pillar and each of the first, second, and third non-detachable attachment points are indirectly coupled to the load member and the fourth non-detachable attachment point is directly coupled to the load member.

In some aspects, the load deflection system further includes a first auxiliary cable member coupled to the load member and to the first non-detachable attachment point, a second auxiliary cable member coupled to the load member and to the second non-detachable attachment point, and a third auxiliary cable member coupled to the load member and to the third non-detachable attachment point.

In some aspects, the load member is a stainless-steel cable and the first, second, and third auxiliary cable members are stainless-steel cable members that are spliced to the load member.

In some aspects, the pulley of the second attachment point is forward of the first, third, and fourth attachment points and the third attachment point is forward of the fourth attachment point and, in response to application of a small offset load to the vehicle, the load member detaches from the third attachment point, engages the upper front rail and the front hinge pillar, and moves in both upward and outward directions relative to the vehicle body axis such that the load member moves away from the frame rail to direct the wheel away from the passenger compartment.

In another embodiment of the present disclosure, a load impact management system for an automotive vehicle having a vehicle body structuring defining a passenger compartment and a vehicle frame supporting a wheel, the vehicle frame including an upper front rail, a frame rail extending parallel to a vehicle body axis, and a front hinge pillar extending perpendicular to the vehicle body axis, includes a load deflection system including a load member, a first attachment point, a pulley coupled to the frame rail at a second attachment point, a third attachment point, and a fourth attachment point, and the load member is coupled to the upper front rail at the first attachment point, coupled to the frame rail at the third attachment point, and coupled to the front hinge pillar at the fourth attachment point, the load member extending generally longitudinally along the frame rail. The load member passes around the pulley from the first attachment point to the fourth attachment point to define a load path between the upper front rail, the frame rail, and the front hinge pillar to utilize the strength of the frame rail.

In some aspects, the load member is a stainless-steel cable having a first end and a second end opposite the first end, the first end of the load member is coupled to the upper front rail at the first attachment point and the second end of the load member is coupled to the front hinge pillar at the fourth attachment point, the first attachment point is non-detachable from the upper front rail, the fourth attachment point is non-detachable from the front hinge pillar, and the third attachment point includes a first detachable attachment point and a second detachable attachment point, the first detachable attachment point including a first connection member that receives the load member and the second detachable attachment point including a second connection member that receives the load member, each of the first and second connection members detachable from the frame rail upon application of a load to the load member.

In some aspects, the pulley of the second attachment point is forward of the first, third, and fourth attachment points and the third attachment point is forward of the fourth attachment point and, in response to application of a small offset load to the vehicle, the load member detaches from the third attachment point, engages the upper front rail and the front hinge pillar, and moves in both upward and outward directions relative to the vehicle body axis such that the load member moves away from the frame rail to direct the wheel away from the passenger compartment.

BRIEF DESCRIPTION OF THE DRAWINGS

The present disclosure will be described in conjunction with the following figures, wherein like numerals denote like elements.

FIG. 4 is a side schematic partial view of the vehicle of FIG. 1, further illustrating the attachment points of the load deflection system, according to an embodiment.

FIG. 4A is an enlarged partial side view of a first attachment point of the load deflection system, according to an embodiment.

FIG. 4B is an enlarged partial side view of a second attachment point of the load deflection system, according to an embodiment.

FIG. 4C is an enlarged partial side view of a fourth attachment point of the load deflection system, according to an embodiment.

FIG. 4D is an enlarged side view of the fourth attachment point of the load deflection system, according to an embodiment.

Figure 1:
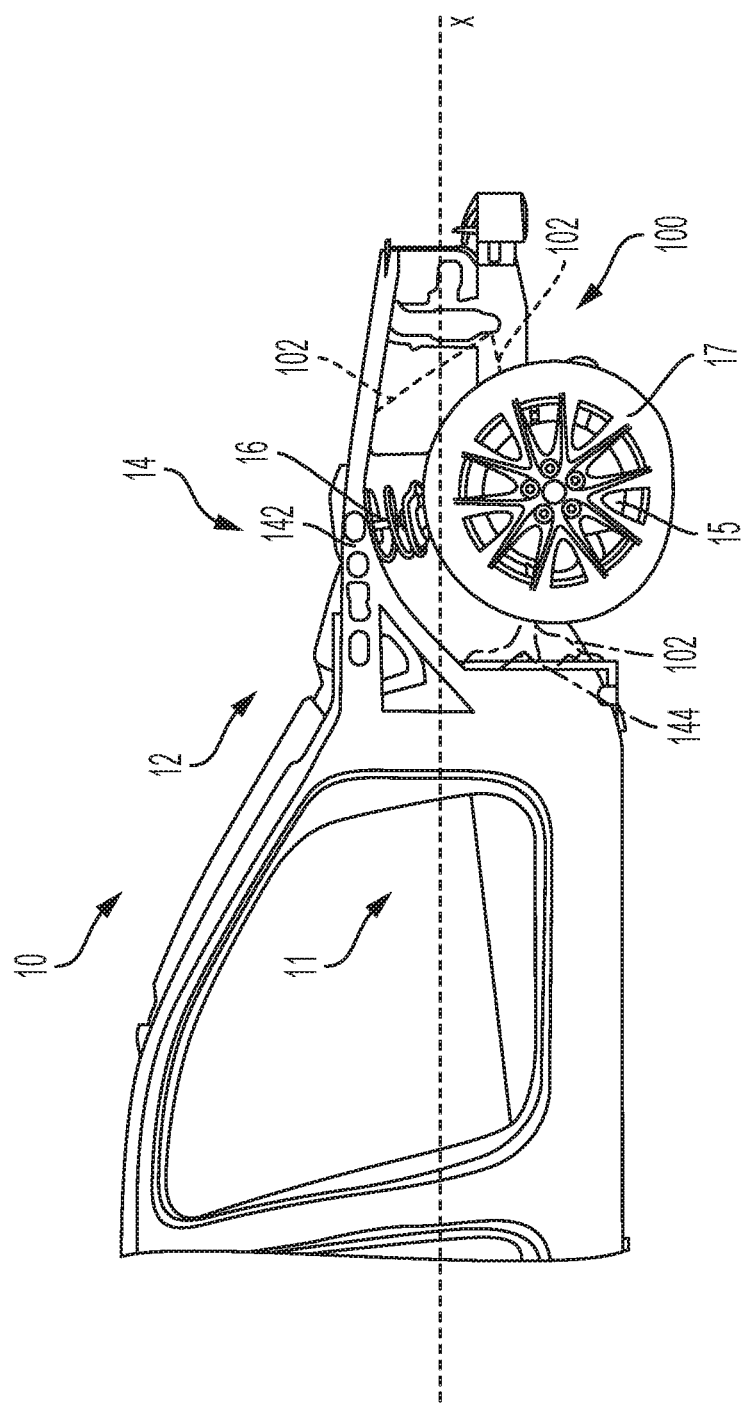
FIG. 1 is a side schematic partial view of a vehicle having a load deflection system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

In various embodiments, as discussed herein, a load deflection system includes a cable coupled to various points of a vehicle frame with a variety of detachable and non-detachable connection points. The cable establishes a new load path between the front hinge pillar region and the upper front rail of a vehicle body structure. The new load path utilizes the strength of the frame rail in a small overall frontal load case which is otherwise not involved in these loading events. The new load path results in outward movement of the wheel during the small overall frontal impact event, reducing structural intrusion with a minimal mass penalty, as well as improving structural design robustness. The multi-point connection design of the load deflection system allows the cable to be loaded without breakage. Furthermore, embodiments discussed herein can be adapted for use with many vehicle architectures with minimal changes.

Figure 2:
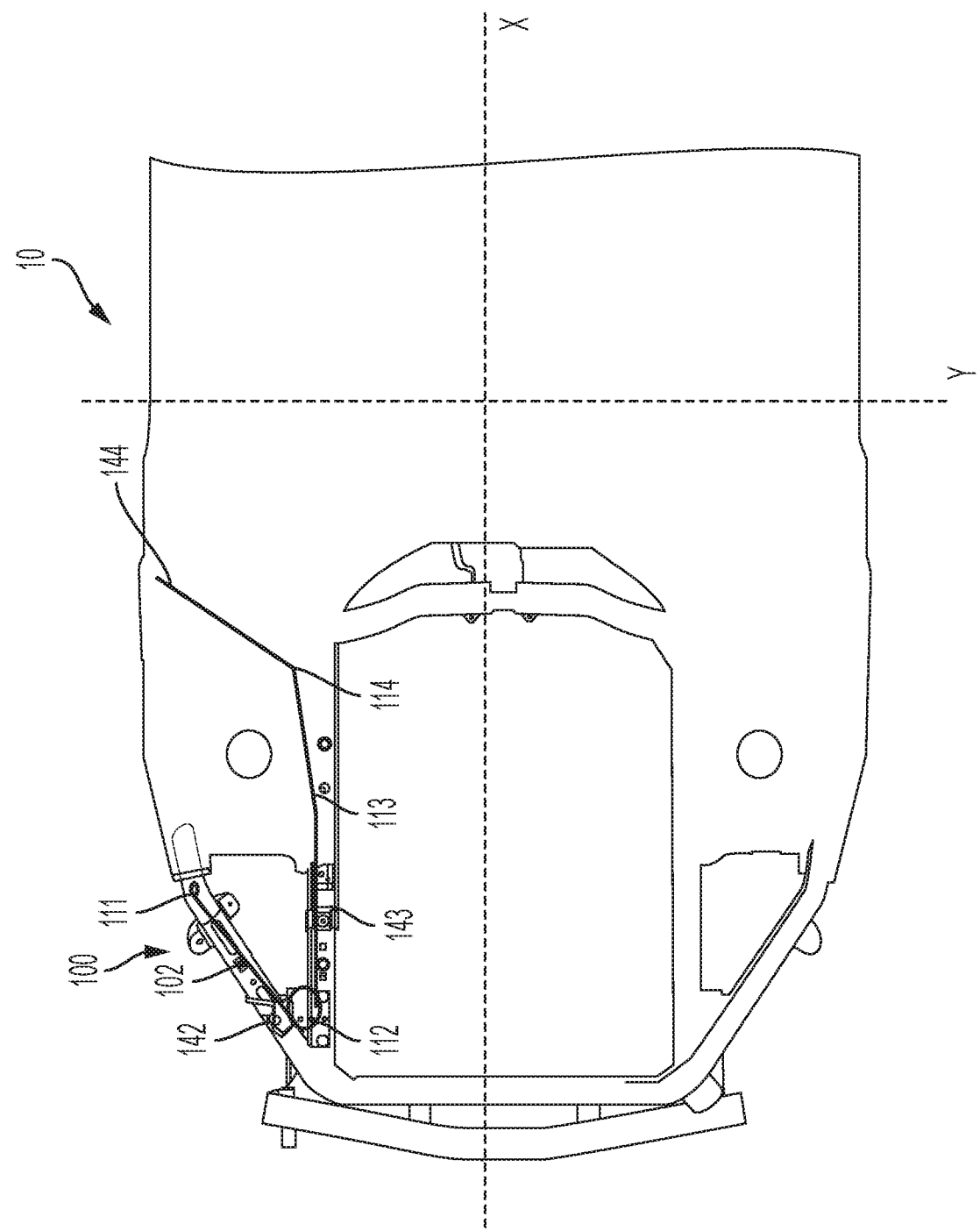
FIG. 2 is a top schematic partial view of the vehicle of FIG. 1, according to an embodiment.

Referring to the drawings, wherein like reference numbers refer to like components, FIG. 1 is a side schematic partial view of a vehicle 10 having a vehicle body structure 12 enclosing a passenger compartment 11, and FIG. 2 is a top schematic partial view of the vehicle 10. The vehicle body structure 12 is constructed from a number of components, such as exterior body panels (not shown), sub-structures, and a frame 14. The vehicle 10 is characterized by a longitudinal vehicle centerline or vehicle body axis that generally coincides with an X-axis and is orthogonal to a Y-axis.

Figure 3:
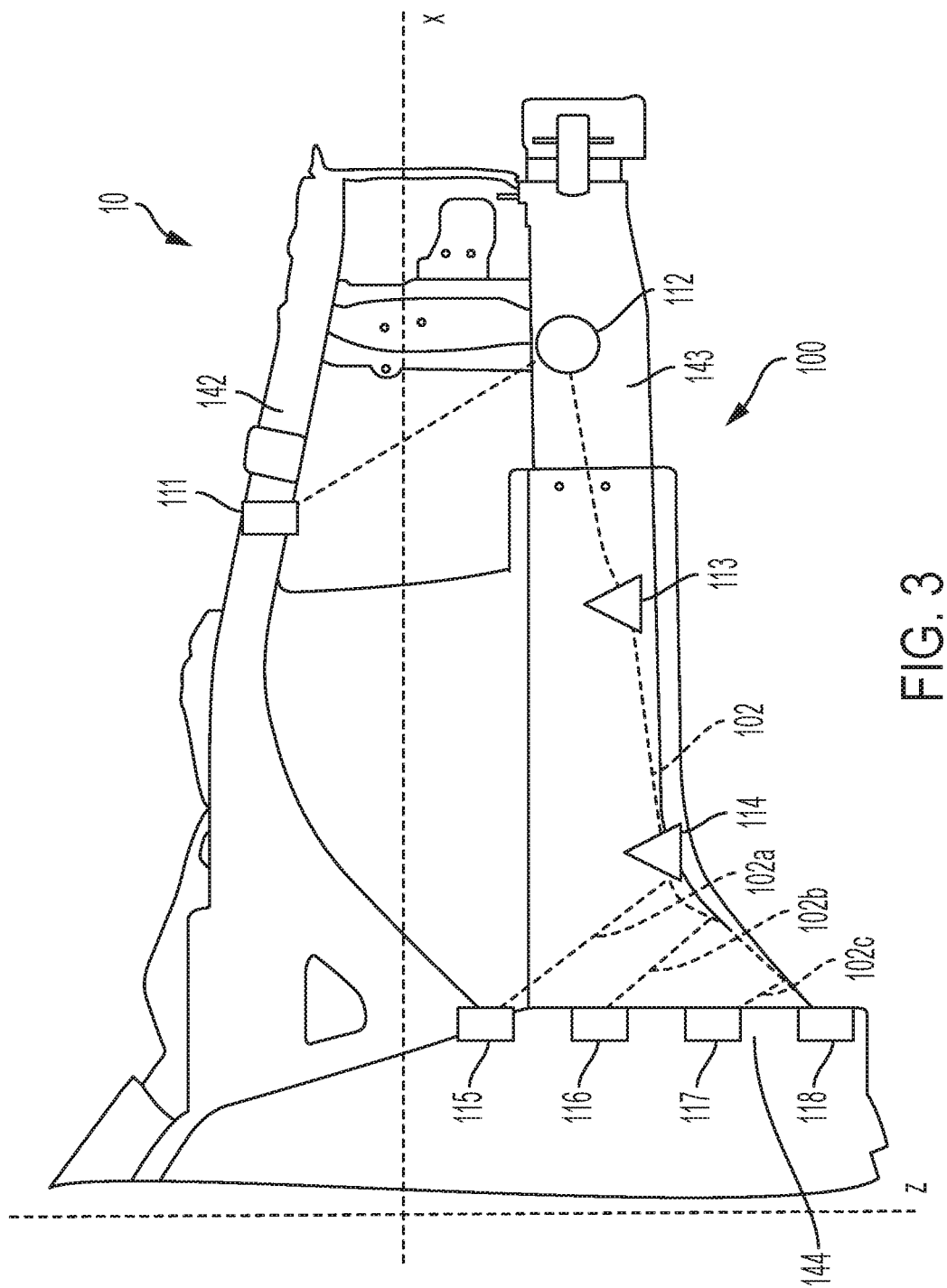
FIG. 3 is a side schematic partial view of the vehicle of FIG. 1, illustrating the attachment points of the load deflection system, according to an embodiment.

The frame 14 enables a support structure for wheel brakes 15, a vehicle suspension component 16, and wheels 17 (one of each shown), while also supporting vehicle subsystems, such as a steering system, and a powertrain (not shown). As shown in FIGS. 1 and 2, the frame 14 is arranged in the general plane of the vehicle 10, substantially defined by the X and Y axes. The frame 14 includes an upper front rail 142 and a longitudinal member or frame rail 143. The frame 14 also includes a front hinge pillar 144 extending substantially vertically, or in the Z direction, as shown in FIG. 3. As appreciated by those skilled in the art, the disclosed vehicle body structure 12 may be used in a rear-wheel drive, a front-wheel drive, or a four-wheel drive configuration.

FIGS. 1 and 2 also illustrate a load deflection system 100. The load deflection system 100 is, in some embodiments, a cable-based deflection system that creates a new load path connecting the front hinge pillar 144 and the upper front rail 142 of the frame 14 using a stainless-steel cable 102. With reference to FIG. 3, the load deflection system 100 includes, in some embodiments, a first attachment point 111, a second attachment point 112, a third attachment point 113, a fourth attachment point 114, a fifth attachment point 115, a sixth attachment point 116, a seventh attachment point 117, and an eighth attachment point 118, as shown in FIG. 3. The cable 102 extends from a first end located at the first attachment point 111 to a second end located at the eighth attachment point 118. The first attachment point 111 is located on the upper front rail 142. The second, third, and fourth attachment points 112, 113, 114 are located on the longitudinal member 143. The fifth, sixth, seventh, and eighth attachment points 115, 116, 117, 118 are located on the front hinge pillar 144.

With reference to FIG. 4, and the detailed enlargements shown in FIGS. 4A-4D, the load deflection system 100 includes a variety of different attachment point configurations, designed to allow load to be transferred to the front rails in the case of a small overlap impact event with minimum mass added to the vehicle 10. With reference to FIG. 4A, the first attachment point 111 includes a sleeve 153 coupled to the upper front rail 142. The sleeve 153 encloses a fastener 151, such as a bolt or screw, over which the cable 102 is wound and fastened. A retention member 152, such as a nut, is coupled to the fastener 151.

The cable 102 is then routed to the second attachment point 112, located on the longitudinal member 143, forward of the first attachment point 111. The second attachment point 112 includes a pulley 122 that allows the cable 102 to move freely about the attachment point 112. The pulley 122 is non-detachably coupled to the longitudinal member 143 and is the forward-most point of the load deflection system 100.

From the pulley 122, in some embodiments, the cable 102 passes through two detachable attachment points, the third and fourth attachment points 113, 114. Enlarged views of the fourth attachment point 114 are shown in FIGS. 4C and 4D. The third attachment point 113 includes a similar structure.

The third and fourth attachment points 113 and 114 are detachable connections to an exterior surface of the longitudinal member 143. That is, the third and fourth attachment points 113 and 114 are connections that are designed to separate from the longitudinal member 143 during a small overlap impact event that loads the cable 102 of the load deflection system 100. A connection member 164 is coupled to the longitudinal member 143 with two attachment members 165, 166. In various embodiments, the connection member 164 and the attachment members 165, 166 are formed from a metal, hardened plastic, or other composite material. In various embodiments, the attachment members 165, 166 are coupled to the longitudinal member 143 using any type of mechanical or chemical means, such as a weld, fastener, or adhesive. In various embodiments, the attachment members 165, 166 are unitarily formed with the connection member 164 and the attachment members 165, 166 couple directly with receiving openings (not shown) in the longitudinal member 143. The connection member 164 is, in some embodiments, a semi-circular member that allows the cable 102 to pass therethrough.

As noted above, the third attachment point 113 is a similar detachable connection to the exterior surface of the longitudinal member 143. The third attachment point 113 is forward of the fourth attachment point 114. In some embodiments, the cable 102 passing through or around the second, third, and fourth attachment points 112, 113, 114 forms a continuous line, as shown in FIG. 4. In other embodiments, the alignment of the attachment points 112, 113, 114 depends on the vehicle configuration and architecture. While two detachable attachment points are illustrated in the figures, it is understood that other embodiments include more or fewer detachable attachment points, depending on the vehicle configuration and architecture.

In various embodiments, from the fourth attachment point 114, the cable 102 is coupled to four non-detachable attachment points, the fifth, sixth, seventh, and eighth attachment points 115, 116, 117, 118. The fifth, sixth, seventh, and eighth attachment points 115, 116, 117, 118 extend in a vertical or Z direction along an exterior-facing surface of the front hinge pillar 144 of the frame 14. In various embodiments, the fifth, sixth, seventh, and eighth attachment points 115, 116, 117, 118 are generally oriented in a straight line; however, the orientation and placement of the fifth, sixth, seventh, and eighth attachment points 115, 116, 117, 118 depend on the vehicle configuration and architecture.

With reference to FIG. 3, the cable 102 includes a first auxiliary cable member 102a, a second auxiliary cable member 102b, and a third auxiliary cable member 102c. The first auxiliary cable member 102a is coupled to the cable 102 at one end and at the other end to the front hinge pillar 144 at the fifth attachment point 115. Similarly, the second auxiliary cable member 102b is coupled to the cable 102 at one end and at the other end to the front hinge pillar 144 at the sixth attachment point 116. The third auxiliary cable member 102c is coupled to the cable 102 at one end and at the other end to the front hinge pillar 144 at the seventh attachment point 117. The second end of the cable 102 opposite the first end is non-detachably coupled to the front hinge pillar 144 at the eighth attachment point 118. In various embodiments, the first, second, and third auxiliary cable members 102a, 102b, 102c are coupled to the cable 102 at different points along the length of the cable 102. However, in other embodiments, one or more of the first, second, and third auxiliary cable members 102a, 102b, 102c are coupled to the cable 102 at the same point along the length of the cable 102. In various embodiments, the first, second, and third auxiliary cable members 102a, 102b, 102c are wound or spliced to the cable 102. In various embodiments, any means of securely attaching the first, second, and third auxiliary cable members 102a, 102b, 102c to the cable 102 may be used. The second ends of the auxiliary cable members 102a, 102b, and 102c are non-detachably coupled to the front hinge pillar 144 at the attachments points 115, 116, and 117 respectively.

In various embodiments, the fifth, sixth, seventh, and eighth attachment points 115, 116, 117, 118 are fasteners, loops, hooks, etc., for example and without limitation, that allow the cable 102 to be non-detachably coupled to the front hinge pillar 144. While four non-detachable attachment points and three auxiliary cable members are illustrated in the figures, it is understood that other embodiments include more or fewer non-detachable attachment points and auxiliary cable members, depending on the vehicle configuration and architecture.

In response to a small overlap impact event, as the upper front rail 142 deforms towards the passenger compartment 11, the cable 102 at the attachment point 111 moves rearward. This causes the cable 102 to be pulled around the pulley 122 at the attachment point 112 and causes the cable 102 to detach from the third and fourth attachment points 113, 114. This reduces the slack in the cable 102 between attachment point 112 and the front hinge pillar 144. The load applied to the cable 102 causes the cable 102 to detach or move in an upward and outward direction away from the longitudinal member 143 at the third and fourth attachment points 113, 114. This upward and outward movement of the cable 102 moves one or more of the wheel brakes 15, the suspension component 16, and the wheel 17 outward and away from intruding into the vehicle passenger compartment 11. The load path established by the cable 102, including the first, second, and third auxiliary cable members 102a, 102b, 102c, utilizes the upper front rail 142 deformation to deflect the load imparted by the small overlap impact event by causing the wheel to rotate outward to reduce or minimize intrusion of vehicle components into the passenger compartment 11.

While one load deflection system 100 is illustrated on one side of the vehicle 10, as best illustrated in FIG. 2, it is understood that other embodiments include a second load deflection system 100 installed on the opposite side of the vehicle 10. Other embodiments include more or fewer detachable and/or non-detachable points and/or pulleys, depending on the vehicle configuration and architecture. The position of any of the attachment points illustrated in the figures may be adjusted based on the vehicle configuration and architecture.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternative at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A structural arrangement for a vehicle, comprising:
    a vehicle frame including an upper front rail, a frame rail, and a front hinge pillar, the vehicle frame extending along a vehicle body axis, the frame rail extending parallel to the vehicle body axis and the front hinge pillar extending perpendicular to the vehicle body axis; and
    a load deflection system including a load member, a first attachment point, a pulley coupled to the frame rail at a second attachment point, a third attachment point, and a fourth attachment point, and the load member is coupled to the upper front rail at the first attachment point, coupled to the frame rail at the third attachment point, and coupled to the front hinge pillar at the fourth attachment point, the load member extending generally longitudinally along the frame rail;
    wherein the load member passes around the pulley from the first attachment point to the fourth attachment point to define a load path between the upper front rail, the frame rail, and the front hinge pillar.

2. The structural arrangement for the vehicle of claim 1, wherein the load member is a stainless-steel cable having a first end and a second end opposite the first end, the first end coupled to the upper front rail at the first attachment point and the second end coupled to the front hinge pillar at the fourth attachment point.

3. The structural arrangement for the vehicle of claim 1, wherein the first attachment point is non-detachable from the upper front rail and the third attachment point includes a connection member that receives the load member and is detachable from the frame rail upon application of a load to the vehicle.

4. The structural arrangement for the vehicle of claim 1, wherein the third attachment point includes a first detachable attachment point and a second detachable attachment point, the first detachable attachment point including a first connection member that receives the load member and the second detachable attachment point including a second connection member that receives the load member, each of the first and second connection members detachable from the frame rail upon application of a load to the load member.

5. The structural arrangement for the vehicle of claim 1, wherein the fourth attachment point is non-detachable from the front hinge pillar.

6. The structural arrangement for the vehicle of claim 1, wherein the fourth attachment point includes a first non-detachable attachment point, a second non-detachable attachment point, a third non-detachable attachment point, and a fourth non-detachable attachment point, the first, second, third, and fourth non-detachable attachment points aligned vertically along the front hinge pillar and each of the first, second, and third non-detachable attachment points are indirectly coupled to the load member and the fourth non-detachable attachment point is directly coupled to the load member.

7. The structural arrangement for the vehicle of claim 6, wherein the load deflection system further includes a first auxiliary cable member coupled to the load member and to the first non-detachable attachment point, a second auxiliary cable member coupled to the load member and to the second non-detachable attachment point, and a third auxiliary cable member coupled to the load member and to the third non-detachable attachment point.

8. The structural arrangement for the vehicle of claim 7, wherein the load member is a stainless-steel cable and the first, second, and third auxiliary cable members are stainless-steel cable members that are spliced to the load member.

9. The structural arrangement for the vehicle of claim 1, wherein the pulley of the second attachment point is forward of the first, third, and fourth attachment points and the third attachment point is forward of the fourth attachment point.

10. The structural arrangement for the vehicle of claim 1, wherein in response to application of a small offset impact to the vehicle, the load member detaches from the third attachment point, engages the upper front rail, the frame rail, and the front hinge pillar and moves in both upward and outward directions relative to the vehicle body axis such that the load member moves away from the frame rail.

11. An automotive vehicle, comprising:
    a vehicle body structure having a vehicle body axis and a vehicle frame arranged along the vehicle body axis, the vehicle body structure defining a passenger compartment and the vehicle frame including an upper front rail, a frame rail, and a front hinge pillar, the frame rail extending parallel to the vehicle body axis and the front hinge pillar extending perpendicular to the vehicle body axis, the vehicle frame supporting a wheel; and
    a load deflection system comprising a load member, a first attachment point, a pulley coupled to the frame rail at a second attachment point, a third attachment point, and a fourth attachment point, and the load member is coupled to the upper front rail at the first attachment point, coupled to the frame rail at the third attachment point, and coupled to the front hinge pillar at the fourth attachment point, the load member extending generally longitudinally along the frame rail;

wherein the load member passes around the pulley from the first attachment point to the fourth attachment point to define a load path between the upper front rail, the frame rail, and the front hinge pillar to utilize the strength of the frame rail and the load member is forward of the passenger compartment.

12. The automotive vehicle of claim 11, wherein the load member is a stainless-steel cable having a first end and a second end opposite the first end, the first end coupled to the upper front rail at the first attachment point and the second end coupled to the front hinge pillar at the fourth attachment point.

13. The automotive vehicle of claim 11, wherein the first attachment point is non-detachable from the upper front rail, the fourth attachment point is non-detachable from the front hinge pillar, and the third attachment point includes a first detachable attachment point and a second detachable attachment point, the first detachable attachment point including a first connection member that receives the load member and the second detachable attachment point including a second connection member that receives the load member, each of the first and second connection members detachable from the frame rail upon application of a load to the load member.

14. The automotive vehicle of claim 11, wherein the fourth attachment point includes a first non-detachable attachment point, a second non-detachable attachment point, a third non-detachable attachment point, and a fourth non-detachable attachment point, the first, second, third, and fourth non-detachable attachment points aligned vertically along the front hinge pillar and each of the first, second, and third non-detachable attachment points are indirectly coupled to the load member and the fourth non-detachable attachment point is directly coupled to the load member.

15. The automotive vehicle of claim 14, wherein the load deflection system further includes a first auxiliary cable member coupled to the load member and to the first non-detachable attachment point, a second auxiliary cable member coupled to the load member and to the second non-detachable attachment point, and a third auxiliary cable member coupled to the load member and to the third non-detachable attachment point.

16. The automotive vehicle of claim 15, wherein the load member is a stainless-steel cable and the first, second, and third auxiliary cable members are stainless-steel cable members that are spliced to the load member.

17. The automotive vehicle of claim 11, wherein the pulley of the second attachment point is forward of the first, third, and fourth attachment points and the third attachment point is forward of the fourth attachment point and, in response to application of a small offset load to the vehicle, the load member detaches from the third attachment point, engages the upper front rail and the front hinge pillar, and moves in both upward and outward directions relative to the vehicle body axis such that the load member moves away from the frame rail to direct the wheel away from the passenger compartment.

18. A load impact management system for an automotive vehicle having a vehicle body structuring defining a passenger compartment and a vehicle frame supporting a wheel, the vehicle frame including an upper front rail, the vehicle frame extending along a vehicle body axis, a frame rail extending parallel to the vehicle body axis, and a front hinge pillar extending perpendicular to the vehicle body axis, the system comprising:
a load deflection system including a load member, a first attachment point, a pulley coupled to the frame rail at a second attachment point, a third attachment point, and a fourth attachment point, and the load member is coupled to the upper front rail at the first attachment point, coupled to the frame rail at the third attachment point, and coupled to the front hinge pillar at the fourth attachment point, the load member extending generally longitudinally along the frame rail;
wherein the load member passes around the pulley from the first attachment point to the fourth attachment point to define a load path between the upper front rail, the frame rail, and the front hinge pillar to utilize the strength of the frame rail.

19. The load impact management system of claim 18, wherein the load member is a stainless-steel cable having a first end and a second end opposite the first end, the first end of the load member is coupled to the upper front rail at the first attachment point and the second end of the load member is coupled to the front hinge pillar at the fourth attachment point, the first attachment point is non-detachable from the upper front rail, the fourth attachment point is non-detachable from the front hinge pillar, and the third attachment point includes a first detachable attachment point and a second detachable attachment point, the first detachable attachment point including a first connection member that receives the load member and the second detachable attachment point including a second connection member that receives the load member, each of the first and second connection members detachable from the frame rail upon application of a load to the load member.

20. The load impact management system of claim 18, wherein the pulley of the second attachment point is forward of the first, third, and fourth attachment points and the third attachment point is forward of the fourth attachment point and, in response to application of a small offset load to the vehicle, the load member detaches from the third attachment point, engages the upper front rail and the front hinge pillar, and moves in both upward and outward directions relative to the vehicle body axis such that the load member moves away from the frame rail to direct the wheel away from the passenger compartment.

* * * * *